(12) United States Patent
Byrne et al.

(10) Patent No.: US 10,814,996 B2
(45) Date of Patent: Oct. 27, 2020

(54) FAN COWL TIE ROD ASSEMBLY

(71) Applicant: ROHR, INC., Chula Vista, CA (US)

(72) Inventors: Stuart J. Byrne, San Diego, CA (US); Thomas Paolini, Felton, CA (US)

(73) Assignee: ROHR, INC., Chula Vista, CA (US)

( * ) Notice: Subject to any disclaimer, the term of this patent is extended or adjusted under 35 U.S.C. 154(b) by 75 days.

(21) Appl. No.: 16/156,948

(22) Filed: Oct. 10, 2018

(65) Prior Publication Data

US 2019/0112063 A1 Apr. 18, 2019

Related U.S. Application Data

(60) Provisional application No. 62/573,590, filed on Oct. 17, 2017.

(51) Int. Cl.
*F01D 25/24* (2006.01)
*B64D 29/08* (2006.01)

(52) U.S. Cl.
CPC .............. *B64D 29/08* (2013.01); *F01D 25/24* (2013.01); *F05D 2220/323* (2013.01); *F05D 2260/30* (2013.01)

(58) Field of Classification Search
CPC ...... B64D 29/08; F01D 25/24; F05D 2260/30
See application file for complete search history.

(56) References Cited

U.S. PATENT DOCUMENTS

| | | | | |
|---|---|---|---|---|
| 4,825,648 A | * | 5/1989 | Adamson | B64D 29/00 60/226.1 |
| 6,227,485 B1 | * | 5/2001 | Porte | B64D 29/08 244/53 B |
| 6,869,046 B2 | * | 3/2005 | McEvoy | B64D 29/08 239/265.19 |
| 7,090,165 B2 | * | 8/2006 | Jones | B64D 29/08 244/53 R |
| 8,686,589 B2 | * | 4/2014 | Pereira | B64D 29/08 307/115 |
| 9,650,917 B2 | | 5/2017 | Stewart et al. | |
| 9,701,413 B2 | | 7/2017 | Provost et al. | |

* cited by examiner

*Primary Examiner* — Ninh H. Nguyen
(74) *Attorney, Agent, or Firm* — Snell & Wilmer L.L.P (57) ABSTRACT

A nacelle may comprise a fan cowl and a tie rod assembly coupled to the fan cowl. The tie rod assembly may comprise a first tie rod coupled to the fan cowl and a second tie rod coupled to the first tie rod and the fan cowl. Rotational motion may be transferred between the first tie rod and the second tie rod. A retention structure may be coupled to an interior surface of the fan cowl.

18 Claims, 7 Drawing Sheets

FAN COWL TIE ROD ASSEMBLY

CROSS REFERENCE TO RELATED APPLICATIONS

This application claims priority to, and the benefit of, U.S. Provisional Application Ser. No. 62/573,590, titled "FAN COWL TIE ROD ASSEMBLY," filed Oct. 17, 2017, which is incorporated herein in its entirety for all purposes by reference.

FIELD

The present disclosure relates to tie rod assemblies, and more specifically, to tie rod assemblies for nacelles for gas turbine engines.

BACKGROUND

Aircraft generally include a nacelle and a gas turbine engine for propulsion. Nacelles of fuselage mounted engines often include two outboard hinged fan cowls. The fan cowls may be configured to pivot between open and closed positions, thereby allowing access to components of the gas turbine engine in the open position and forming an aerodynamic shell over the components of the gas turbine engine in the closed position. In the closed position, tie rods may extend between the fan cowls to aid in maintaining hoop continuity of the nacelle. The tie rods tend to be difficult to align when closing the fan cowls and can also impede a mechanic's access to the engine when the fan cowl is in the open position.

SUMMARY

In various embodiments, the present disclosure provides a tie rod assembly for a fan cowl of a nacelle. The tie rod assembly may comprise a first tie rod pivotally coupled to an interior surface of the fan cowl, and a first connecting rod coupled to the first tie rod. Rotational motion may be transferred between the first tie rod and the first connecting rod. A second tie rod may be pivotally coupled to the interior surface of the fan cowl and in operable communication with the first connecting rod. Rotational motion of greater than a predetermined tolerance by at least one of the first tie rod or the second tie rod may be transferred to the other of the first tie rod or the second tie rod, and rotational motion of less than the predetermined tolerance by at least one of the first tie rod or the second tie rod may not be transferred to the other of the first tie rod or the second tie rod.

In various embodiments, a second connecting rod may be coupled to the second tie rod. Rotational motion may be transferred between the second tie rod and the second connecting rod. A flex joint may couple the first connecting rod and the second connecting rod. The flex joint may comprise at least one of a flexible sleeve joint or a universal joint.

In various embodiments, the first connecting rod may comprise a cable configured to transfer a rotational load and absorb a non-rotational load. The cable may comprise a carbon fiber reinforced polymer composite material. In various embodiments, the first connecting rod may comprise a material that can deformably twist to the predetermined tolerance before transferring rotational motion.

In various embodiments, the first tie rod may be coupled to the first connecting rod by at least one of a coupling that can deformably twist to the predetermined tolerance before transferring rotational motion or a coupling comprising a locking feature configured to allow the first tie rod and the first connecting rod to rotate to the predetermined tolerance before the locking feature is engaged and rotational motion is transferred.

Also disclosed herein, according to various embodiments, is a nacelle. The nacelle may comprise a fan cowl and a tie rod assembly coupled to the fan cowl. The tie rod assembly may comprise a first tie rod pivotally coupled to an interior surface of the fan cowl, a first connecting rod coupled to the first tie rod, a second tie rod coupled to the first tie rod and the interior surface of fan cowl, a second connecting rod coupled to the second tie rod, and a flex joint coupling the first connecting rod to the second connecting rod. The flex joint may transfer rotational motion between the first connecting rod and the second connecting rod.

In various embodiments, the flex joint may comprise at least one of a flexible sleeve joint or a universal joint. The fan cowl may comprise a first portion hingedly coupled to an outboard side of the nacelle, and a second portion hingedly coupled to the outboard side of the nacelle.

In various embodiments, a first end of the first tie rod may be coupled to the first portion of the fan cowl. A second end of the first tie rod opposite the first end of the first tie rod may be configured to couple to the second portion of the fan cowl. A first end of the second tie rod may be coupled to the first portion of the fan cowl. A second end of the second tie rod opposite the first end of the second tie rod may be configured to couple to the second portion of the fan cowl.

In various embodiments, a pylon may be located on an inboard side of the nacelle. The pylon may define an aperture configured to receive at least one of the first tie rod or the second tie rod.

In various embodiments, a retention structure may be mounted to an interior surface of the fan cowl. The retention structure may be configured to engage the first tie rod and retain the first tie rod and the second tie rod proximate the interior surface of the fan cowl. In various embodiments, the flex joint may comprise a universal joint.

Also disclosed herein, according to various embodiments, is a nacelle comprising a fan cowl, a first tie rod coupled to the fan cowl, and a retention structure coupled to an interior surface of the fan cowl and configured to engage the first tie rod.

In various embodiments, the retention structure may comprise at least one of a hook, a broom clip, or a snap fastener. A second tie rod may be coupled to the fan cowl and the first tie rod. A connecting rod may be coupled to the first tie rod and the second tie rod. The connecting rod may transfer rotational motion between the first tie rod and the second tie rod. In various embodiments, a first connecting rod may be coupled to the first tie rod. A second connecting rod may be coupled to the second tie rod. A flex joint may be coupled to the first connecting rod and the second connecting rod. The flex joint may transfer rotational motion between the first connecting rod and the second connecting rod. The flex joint may comprise a universal joint.

The forgoing features and elements may be combined in various combinations without exclusivity, unless expressly indicated herein otherwise. These features and elements as well as the operation of the disclosed embodiments will become more apparent in light of the following description and accompanying drawings.

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein without departing from the spirit and scope of the disclosure. Thus, the detailed description herein is presented for purposes of illustration only and not of limitation.

As used herein, "aft" refers to the direction associated with the exhaust (e.g., the back end) of a nacelle. As used herein, "forward" refers to the direction associated with the intake (e.g., the front end) of a nacelle. As used herein, "distal" refers to the direction outward, or generally, away from a reference component. As used herein, "proximate" refers to a direction inward, or generally, towards the reference component. As used herein, "rotational motion" or "rotary motion" refers to movement in a circumferential direction or generally about an axis. As used herein, "axial motion" refers to forward and aft movement, or movement in a direction generally parallel to a nacelle centerline axis. As used herein, "radial motion" refers movement toward or away from an axis, or motion in a direction generally towards or away from the nacelle centerline axis.

Nacelles of the present disclosure may include a fan cowl having a tie rod assembly mounted thereto. The tie rod assembly may include a plurality of tie rods that may be pivotally coupled to an interior surface of the fan cowl. In various embodiments, the tie rods may be coupled to one another such that rotating one tie rod may cause the other tie rods to rotate. A retention structure may be mounted to the interior surface of the fan cowl. The retention structure may be configured to engage a tie rod of the tie rod assembly and retain the tie rods proximate to the interior surface of the fan cowl, when the fan cowl is in an open position. The tie rod assembly and retention structure may thus allow a mechanic or other operator to more easily maneuver the tie rods and access the components within the nacelle.

Figure 1A:
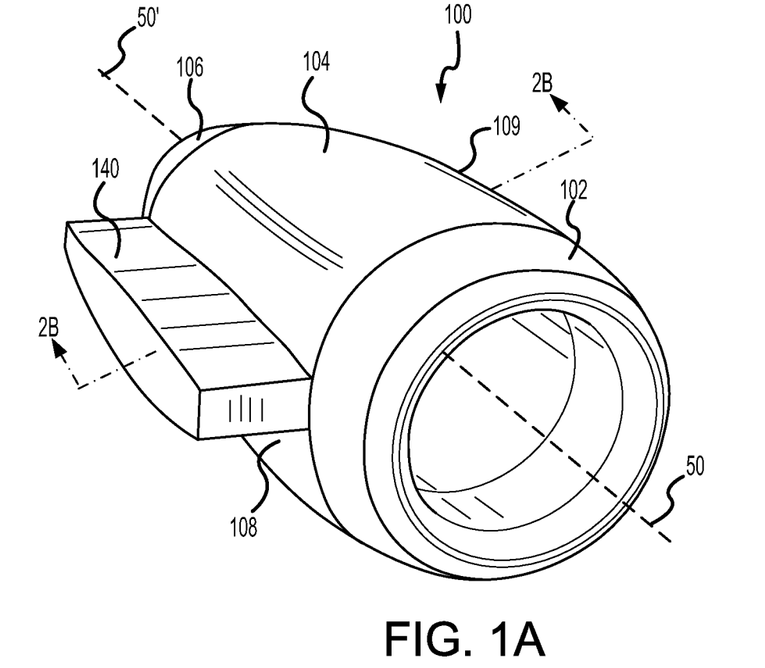
FIG. 1A illustrates a perspective view of a nacelle, for a gas turbine engine, in a closed position, in accordance with various embodiments.

With reference to FIG. 1A, a nacelle 100 for a gas turbine engine is illustrated, according to various embodiments. The nacelle 100 may be suitable for an aircraft. Nacelle 100 may have a centerline axis 50-50' and may include an inlet 102, a fan cowl 104, and a nozzle 106. Nacelle 100 may be coupled to a pylon 140. Pylon 140 may support attachment of nacelle 100 to an aircraft fuselage. Pylon 140 may be located proximate an inboard side 108 of nacelle 100. As used herein, "inboard" refers to a side located generally proximate an aircraft fuselage. In various embodiments, and with momentary reference to FIG. 2B, pylon 140 may be located between nacelle 100 and aircraft fuselage 144. Pylon 140 may be mounted to a gas turbine engine 200 located radially inward of fan cowl 104.

Figure 1B:
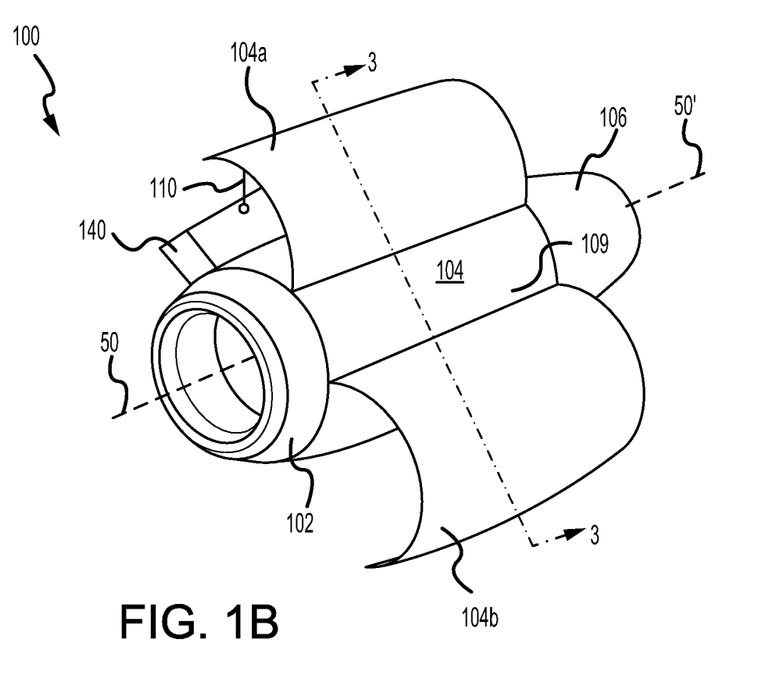
FIG. 1B illustrates a perspective view of a nacelle, for a gas turbine engine, in an open position, in accordance with various embodiments.

With reference to FIG. 1B, nacelle 100 is illustrated with fan cowl 104 in an open position, in accordance with various embodiments. Fan cowl 104 may include two panels or portions (e.g., a first fan cowl portion 104a and a second fan cowl portion 104b) that are hingedly, or pivotally, mounted via one or more hinges located on an outboard side 109 of nacelle 100. As used herein, "outboard" refers to a side located distal or away from the aircraft fuselage. Outboard side 109 is generally opposite, inboard side 108. Thus, nacelle 100 may include first fan cowl portion 104a and second fan cowl portion 104b which can each be rotated between an open position (FIG. 1B) and a closed position (FIG. 2A) to allow access to components (e.g., a gas turbine engine) located radially inward of nacelle 100.

Figure 2A:
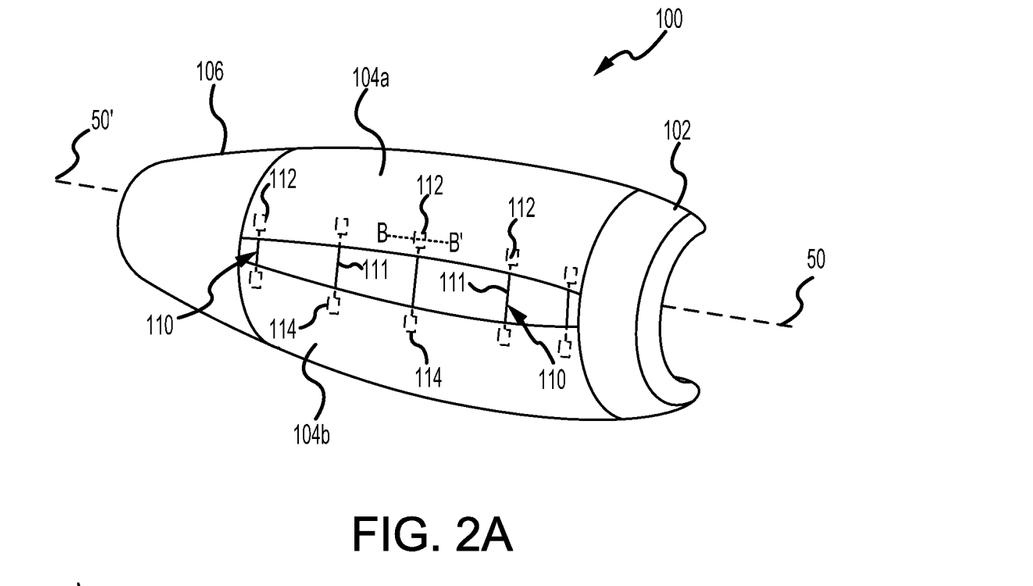
FIG. 2A illustrates an inboard view of tie rods extending between portions of a fan cowl in a closed position, in accordance with various embodiments.
Figure 2B:
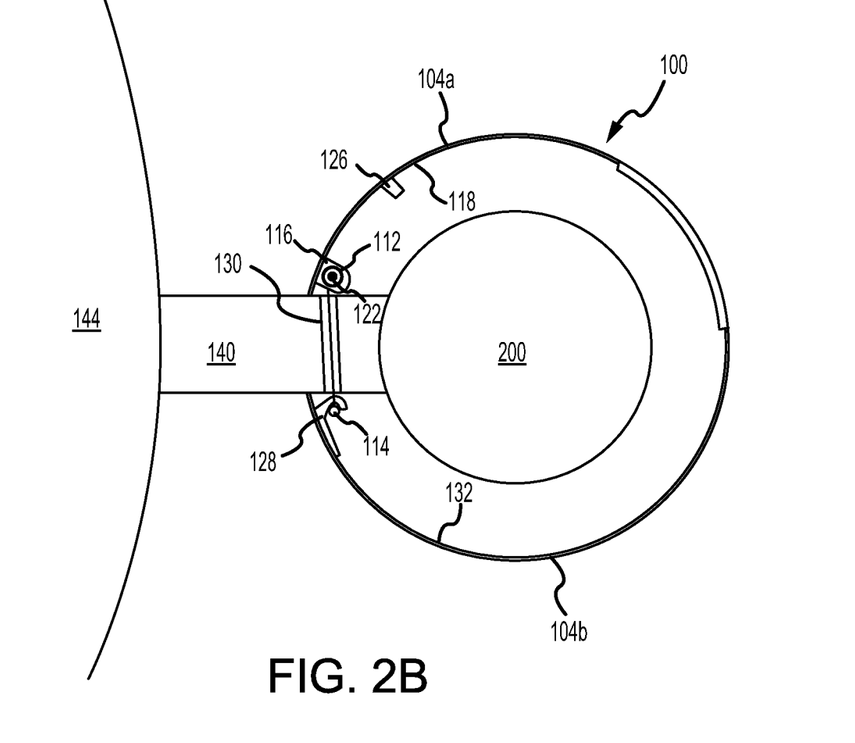
FIG. 2B illustrates a cross-section view of tie rods extending between portions of a fan cowl in a closed position taken along the line 2B-2B in FIG. 1A, in accordance with various embodiments

In accordance with various embodiments, FIGS. 2A and 2B show, respectively, an inboard side perspective view and an aftward looking cross-section view of nacelle 100, with first and second fan cowl portions 104a, 104b in the closed position. In FIG. 2A, pylon 140 has been removed for clarity. In various embodiments, one or more tie rods 110 may extend between first fan cowl portion 104a and second fan cowl portion 104b. Tie rods 110 may aid in retaining first and second fan cowl portions 104a, 104b in the closed position. Tie rods 110 may also aid in maintaining a hoop continuity of fan cowl 104 and/or nacelle 100. Tie rods 110 may each comprise a first end 112, a second end 114 opposite first end 112, and a shaft 111 extending between first end 112 and second end 114.

Figure 3:
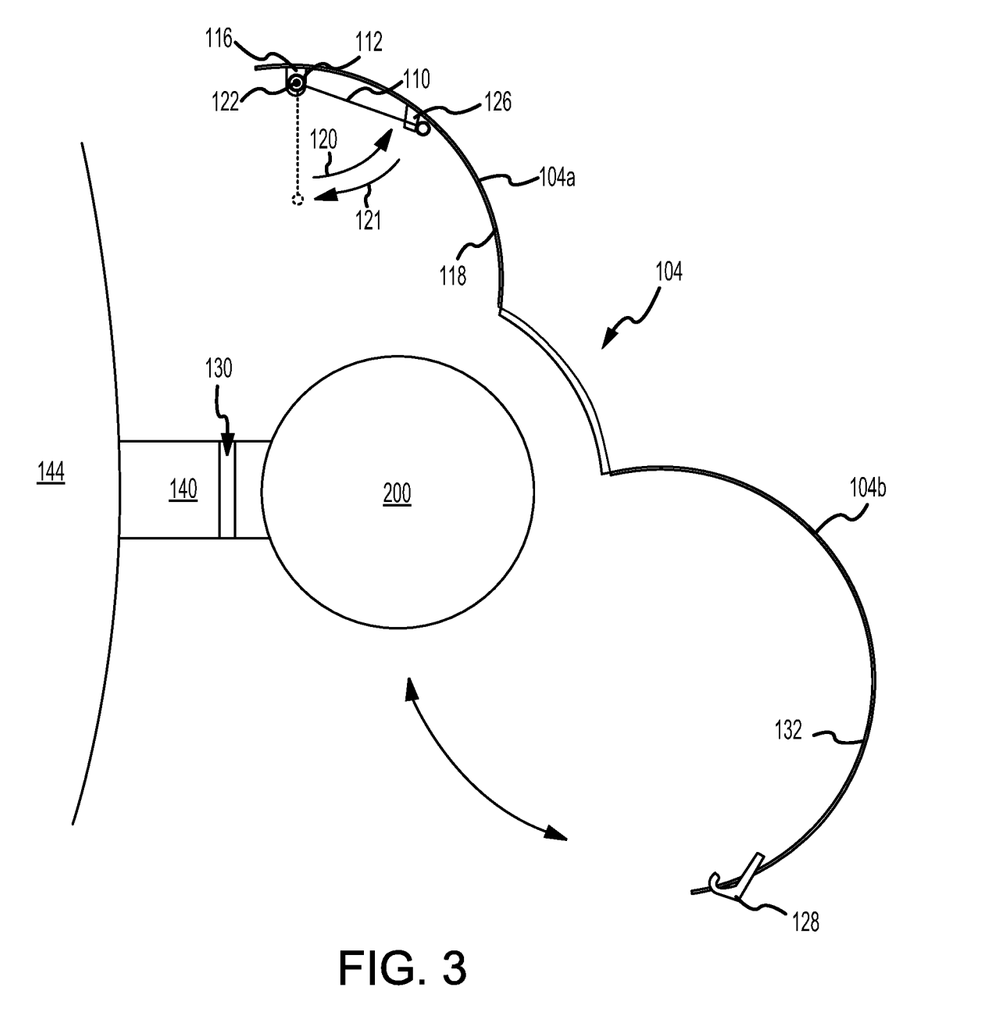
FIG. 3 illustrates a cross-section view of a fan cowl in an open position taken along the line 3-3 in FIG. 1B, in accordance with various embodiments.

With reference to FIG. 2B and FIG. 3, in various embodiments, first end 112 of each tie rod 110 may be coupled to first fan cowl portion 104a via a connector 116. Connector 116 may be mounted or otherwise fixed to an interior surface 118 of first fan cowl portion 104a. Connector 116 may be configured to allow tie rod 110 to pivot, or rotate, about an axis B-B', with momentary reference to FIG. 2A, of first end 112. In various embodiments, axis B-B' may be parallel to centerline axis 50-50' (FIG. 2A). Connector 116 may be configured to allow tie rod 110 to rotate toward and away from interior surface 118 of first fan cowl portion 104a (e.g., in the direction of arrows 120 and 121, in FIG. 3). Stated differently, tie rod 110 may be pivotally coupled to interior surface 118 of first fan cowl portion 104a via connector 116.

In various embodiments, connector 116 may comprise a pair of flanges or a clevis extending from interior surface 118. Tie rod 110 may be pivotally coupled to the flanges/ clevis via a coupling 122 extending through the flanges/ clevis. Coupling 122 may comprise an axle (e.g., a pin, bolt, rod, etc.) attached to first end 112 and configured to allow tie rod 110 to rotate relative to connector 116 and interior surface 118. In various embodiments, first end 112 of tie rod 110 may comprise a pair of flanges or a clevis, and connector 116 may comprise an axle (e.g., a pin, bolt, rod, etc.) attached to interior surface 118 and extending through first end 112.

When fan cowl 104 is in the closed position, second end 114 of tie rod 110 may engage a tie rod mating feature 128 on second fan cowl portion 104b. Mating feature 128 may be mounted or otherwise coupled to an interior surface 132 of second fan cowl portion 104b. Mating feature 128 and second end 114 of tie rod 110 are configured to engage one another and secure first and second fan cowl portions 104a, 104b in the closed position. Stated differently, an engagement between mating feature 128 and second end 114 of tie rod 110 may prevent first and second fan cowl portions 104a, 104b from opening (i.e., pivoting about their outboard hinge joints). Mating feature 128 may include a hook, clip, snap fastener, tie, or other component capable of securing second end 114 to second fan cowl portion 104b. In various embodiments, pylon 140 may define one or more aperture(s) 130. In various embodiments, tie rods 110 may extend through aperture(s) 130, when fan cowl 104 is in the closed position.

When first and second fan cowl portions 104a, 104b are in the open position, as shown in FIG. 3, second end 114 of tie rod 110 may be rotated toward interior surface 118 of first fan cowl portion 104a (i.e., in the direction of arrow 120). Tie rod 110 may be retained proximate interior surface 118 by a retention structure 126. Retention structure 126 may be mounted or otherwise coupled to interior surface 118 of first fan cowl portion 104a. Retention structure 126 may be configured to engage tie rod 110 and secure tie rod 110 proximate interior surface 118. Engagement of tie rod 110 by retention structure 126 may prevent tie rod 110 from rotating in the direction of arrow 121.

Figure 6A:
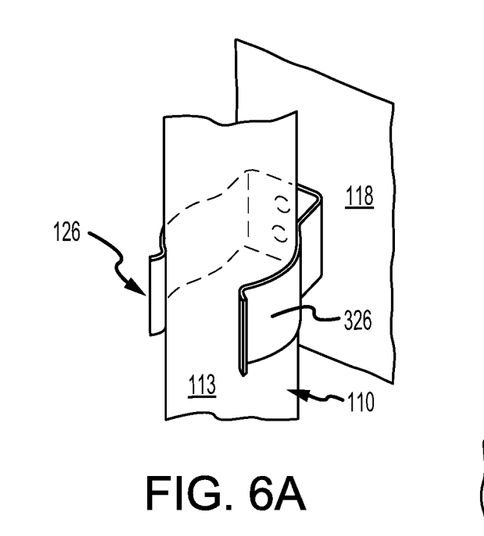
FIGS. 6A, 6B, and 6C illustrate exemplary retention structures of a tie rod assembly, in accordance with various embodiments.

With reference to FIG. 6A, in various embodiments, retention structure 126 may comprise a broom clip 326. Broom clip 326 may be coupled to interior surface 118 and configured to engage tie rod 110 such that locating broom clip 326 around the outer circumferential surface 113 of tie rod 110 retains tie rod 110 proximate interior surface 118.

Figure 6B:
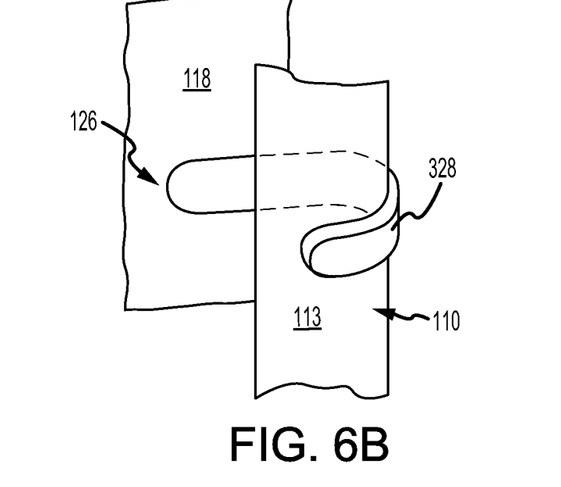

With reference to FIG. 6B, in various embodiments, retention structure 126 may comprise a hook 328. Hook 328 may be coupled to interior surface 118 and configured to engage tie rod 110 such that locating hook 328 around outer circumferential surface 113 of tie rod 110 retains tie rod 110 proximate interior surface 118.

Figure 6C:
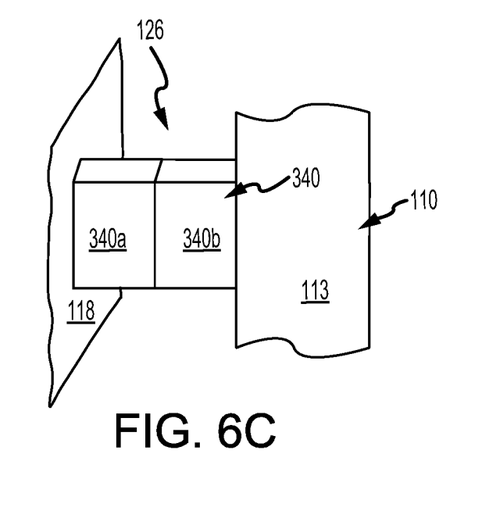

With reference to FIG. 6C, in various embodiments, retention structure 126 may comprise a snap fastener 340. A first portion 340a of snap fastener 340 may be coupled to interior surface 118, and a second portion 340b of snap fastener 340 may be coupled to tie rod 110. First portion 340a may be configured to engage second portion 340b, thereby retaining tie rod 110 proximate interior surface 118. Retention structure 126 may also comprise a tie or lacing, hook and loop fasteners, or other fastener capable of engaging and retaining tie rod 110 proximate interior surface 118. Returning to FIG. 3, locating and retaining tie rods 110 proximate interior surface 118 may offer a mechanic or other personnel a greater clearance for accessing gas turbine engine 200. Stated differently, securing tie rods 110 to interior surface 118 may reduce occurrences of tie rods 110 blocking, impeding, or otherwise hindering access to components housed within nacelle 100.

Figure 4:
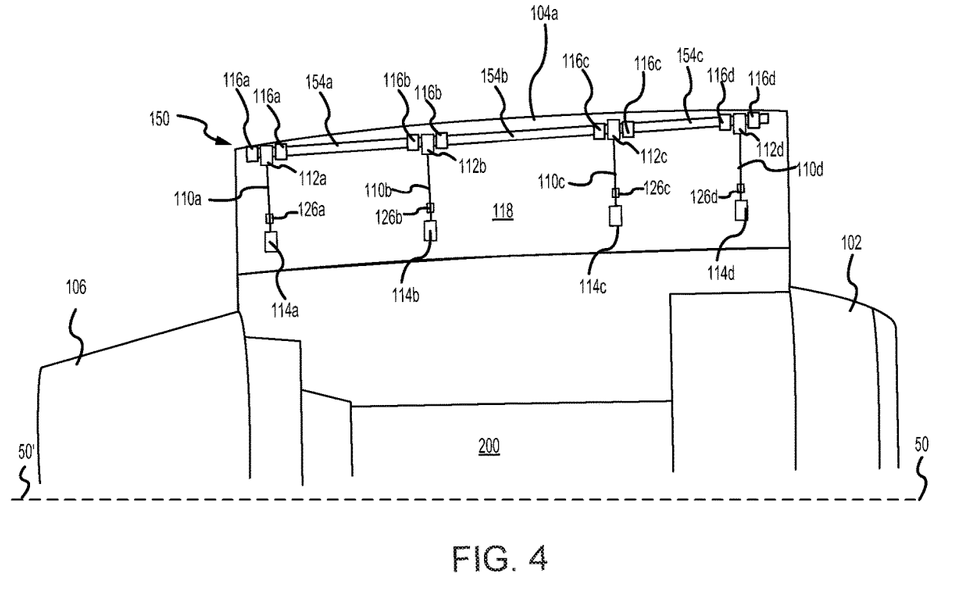
FIG. 4 illustrates a tie rod assembly on an interior surface of a fan cowl, in accordance with various embodiments.

Referring to FIG. 4, a tie rod assembly 150 is illustrated, in accordance with various embodiments. Tie rod assembly 150 may comprise multiple tie rods 110 (e.g., tie rod 110a, tie rod 110b, tie rod 110c, tie rod 110d). The tie rods of tie rod assembly 150 may be coupled to one another such that a translation of one tie rod is transferred to the other tie rods. For example, tie rods 110a, 110b, 110c, 110d may be coupled to one another in manner that allows all of the tie rods 110a, 110b, 110c, 110d to be manipulated (e.g., moved in the direction of arrows 120 and 121 in FIG. 3) by a single operator and from a single operating location, for example, from a forward end of first fan cowl portion 104a. While tie rod assembly 150 is illustrated as having four tie rods 110, it is further contemplated and understood that tie rod assembly 150 may include any number of tie rods 110.

Tie rods 110a, 110b, 110c, 110d may each be pivotally coupled to interior surface 118 by a connector 116a, 116b, 116c, 116d, respectively. A connecting rod 154a may couple tie rod 110a to tie rod 110b. A connecting rod 154b may couple tie rod 110b to tie rod 110c. A connecting rod 154c may couple tie rod 110c to tie rod 110d. In various embodiments, connecting rods 154a, 154b, 154c may be part of a single, unibody rod that includes couplings 122 (with momentary reference to FIG. 2B) and that extends through connectors 116a, 116b, 116c, 116d. Tie rods 110a, 110b, 110c, 110d and connecting rods 154a, 154b, 154c may be configured such that tie rods 110a, 110b, 110c, 110d can be rotated as a group. Stated differently, tie rods 110a, 110b, 110c, 110d and connecting rods 154a, 154b, 154c may be rotationally coupled to one another. For example, tie rods 110a, 110b, 110c, 110d and connecting rods 154a, 154b, 154c may be configured such that rotating a single tie rod (e.g., tie rod 110a) toward interior surface 118 will cause the other tie rods (e.g., tie rods 110b, 110c, 110d) to rotate toward interior surface 118.

Tie rods 110a, 110b, 110c, 110d and connecting rods 154a, 154b, 154c may be configured such that rotational motion (i.e., motion about axis B-B' in FIG. 2A) will be transmitted between the tie rods, while other types of motion, for example, axial motion (i.e., motion in a direction parallel to axis B-B') and/or radial motion (i.e., motion toward and away from axis B-B') will be not transmitted between the tie rods. In various embodiments, connecting rods 154a, 154b, 154c may comprise a metal, such as aluminum, nickel, titanium, steel, and/or alloys of the same. In various embodiments, connecting rods 154a, 154b, 154c may comprise a cable or composite material, such as carbon fiber reinforced polymer, configured to transmit rotation loads and to absorb loads in other directions (e.g., loads generated by axial or radial motion).

In various embodiments, tie rods 110a, 110b, 110c, 110d and connecting rods 154a, 154b, 154c may be rotationally coupled such that each tie rod 110a, 110b, 110c, 110d may be rotated slightly (e.g., between 0° and 10°, or between 0° and 5° degrees, etc.) without causing the other tie rods to rotate. For example, tie rod 110a may be coupled to connecting rod 154a in a manner that allows tie rod 110a to rotate up to a preselected tolerance, or number of degrees (e.g., 10°, 5°, etc.), before the rotary motion of tie rod 110a is transmitted to tie rod 110b. Once tie rod 110a rotates beyond the preselected tolerance, the rotary motion is transmitted, via connecting rod 154a, to tie rod 110b which in turn causes connecting rods 154b and 154c and tie rods 110c and 110d to rotate.

In various embodiments, connecting rods 154a, 154b, 154c may comprise a material that can deformably twist a predetermined tolerance (e.g., 10° or less, 5° or less, etc.) at one end before the rotational motion is transferred to the opposite end. For example, in various embodiments, connecting rod 154a may comprise a material that can deformably twist a few degrees (e.g., 10° or less, 5° or less, etc.) a before transferring rotational motion. Thus, either tie rod 110a or tie rod 110b may be rotated up to the tolerance of connecting rod 154a before connecting rod 154a begins to rotate the other of tie rod 110a or tie rod 110b.

In various embodiments, tie rods 110a, 110b, 110c, 110d may be coupled to connecting rods 154a, 154b, 154c via a sleeve joint or other coupling that can deformably twist, a predetermined number of degrees (e.g., 10° or less, 5° or less, etc.) before transferring rotational motion between the components (e.g. between the tie rod and the connecting rod).

In various embodiments, tie rods 110a, 110b, 110c, 110d may be coupled to connecting rods 154a, 154b, 154c by a sleeve joint, nut, or other coupling that comprises a locking feature configured to allow the tie rod or the connecting rod to rotate a predetermined tolerance (i.e., a predetermined number of degrees), before engaging the locking feature. Once a rotation of the tie rod or the connecting rod causes the locking feature to engage (i.e., after either the tie rod or the connecting rod rotates beyond the tolerance of the locking feature), the sleeve joint, nut, or other coupling also begins rotate, causing the other of the tie rod or the connecting rod to rotate.

With combined reference to FIG. 2B and FIG. 4, when closing first and second fan cowl portions 104a, 104b, second end 114a, 114b, 114c, 114d of tie rods 110a, 110b, 110c, 110d may need align with aperture(s) 130. The location and orientation of apertures 130 may vary along pylon 140, for example, due to other structures within pylon 140. Incorporating rotational tolerances into tie rod assembly 150 allows for minor manipulations of the individual tie rods, which may allow an operator to more easily align each tie rod 110 with its respective aperture 130.

With continued reference to FIG. 4, in various embodiments, multiple retention structures (e.g., retentions structures 126a, 126b, 126c, 126d) may be mounted to interior surface 118 of first fan cowl portion 104a. In various embodiments, each tie rod 110a, 110b, 110c, 110d may have a dedicated retention structure 126a, 126b, 126c, 126d, respectively. Tie rods 110a, 110b, 110c, 110d may be coupled to one another such that rotating one tie rod into engagement with its respective retention structure (e.g., rotating tie rod 110a into retention structure 126a) may cause the other retention structures (126b, 126c, 126d) to engage their respective tie rods (110b, 110c, 110d). In various embodiments, interior surface 118 may include a single retention structure 126 and all the tie rods 110 may be retained proximate interior surface 118 by engaging one of the tie rods (e.g., tie rod 110a) in the retention structure.

Figure 5:
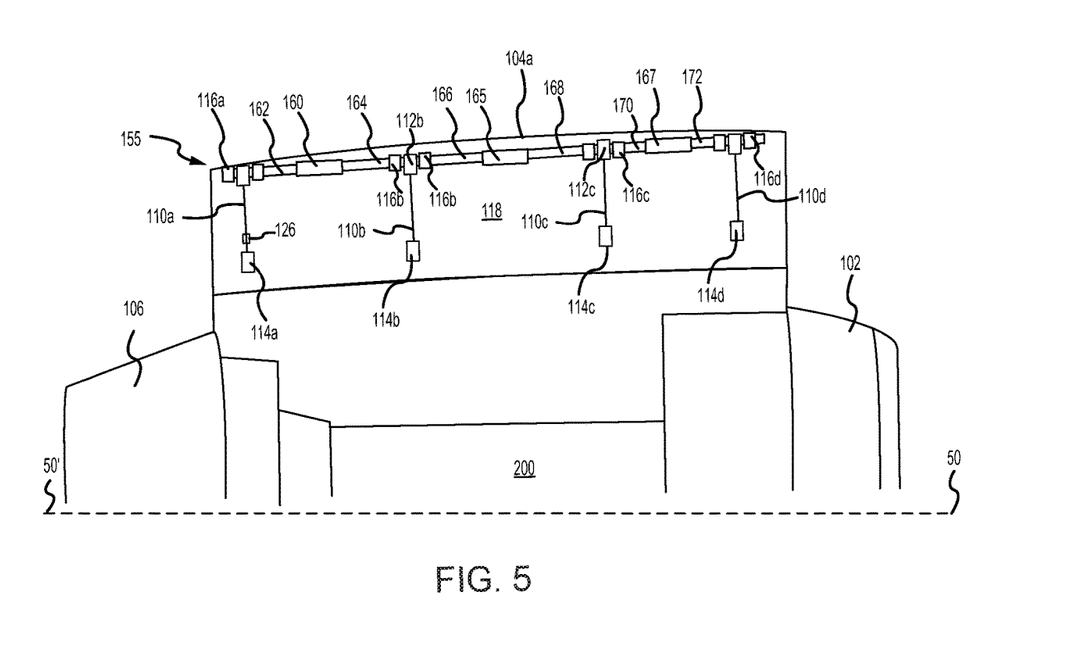
FIG. 5 illustrates a tie rod assembly with flex joints on an interior surface of a fan cowl, in accordance with various embodiments.

With reference to FIG. 5, a tie rod assembly 155 having connecting rods coupled via flex joints is illustrated, in accordance with various embodiments. In various embodiments, one or more of the connecting rods used to couple tie rods 110a, 110b, 110c, 110d to one another may be connected by a flex joint. For example, tie rod 110a may be coupled to a connecting rod 162, tie rod 110b may be coupled to a connecting rod 164, and a flex joint 160 may couple connecting rod 162 to connecting rod 164. Tie rod 110b may be coupled to connecting rod 166, tie rod 110c may be coupled to a connecting rod 168, and a flex joint 165 may couple connecting rod 166 to connecting rod 168. Tie rod 110c may be coupled to a connecting rod 170, tie rod 110d may be coupled to a connecting rod 172, and a flex joint 167 may couple connecting rod 170 to connecting rod 172. In various embodiments, connecting rods 164 and 166 may be integral to one another, such that connecting rods 164 and 166 are part of a single, unibody rod extending from flex joint 160 to flex joint 165. In various embodiments, connecting rods 168 and 170 may be part of a single, unibody rod extending from flex joint 165 to flex joint 167.

Flex joints 160, 165, 167 may each be configured to transfer rotational loads (i.e., rotational motion) between the connecting rods without transferring non-rotational load. For example, rotational movement of connecting rod 162 may be transferred to connecting rod 164 via flex joint 160, while axial or radial movement of connecting rod 162 is absorbed (i.e., not transferred). In various embodiments, flex joints 160, 165, 167 may each comprise a flexible sleeve joint formed of elastomer or other elastic material configured to transfer rotational loads and absorb non-rotation loads. In various embodiments, one or more flex joints 160, 165, 167 may each comprise a universal joint ("U joint") configured to couple adjacent connecting rods that are oriented at an angle (i.e., not co-linear) relative to one another. For example, in various embodiments, connecting rod 162 may be oriented at an angle (other than 180°) relative to connecting rod 164, and flex joint 160 may transfer rotational motion (e.g., the motion in the direction of arrows 120 and 121 in FIG. 3) between connecting rods 162 and 164, while allowing connecting rods to 162 and/or 164 to pivot relative the flex joint 160 in other directions.

During flight, various areas of the fan cowl 104 may experience different deflection loads. For example, a forward end of fan cowl 104 may experience greater deflection loads during a take-off maneuver than aft areas of fan cowl 104. Flex joints 160, 165, 167 may prevent or reduce a likelihood that the deflection or pressure load experienced by the forward tie rods (e.g., tie rods 110d and/or 110c) will be transferred to the more aft tie rods (e.g. tie rods 110a and/or 110b).

With combined reference to FIG. 2B and FIG. 5, flex joints 160, 165, 167 may each include a predetermined rotational tolerance to allow second ends 114a, 114b, 114c, 114d of tie rods 110a, 110b, 110c, 110d to be more easily aligned with their respective apertures 130 and/or mating features 128. For example, when closing first and second fan cowl portions 104a, 104b, an operator may swing tie rods 110b, 110c, 110d in the direction of arrow 121 (FIG. 3) by applying a force to tie rod 110a. The operator may align second end 114a of tie rod 110a with its aperture 130. However, due to variations in the location and orientation of the apertures 130 along pylon 140, one or more tie rods 110b, 110c, 110d may not be aligned with its respective aperture 130. A rotational tolerance of flex joints 160, 165, 167 may allow any each tie rod 110a, 110b, 110c, 110d to be manipulated up to the rotational tolerance, without moving the other tie rods.

Figure 7:
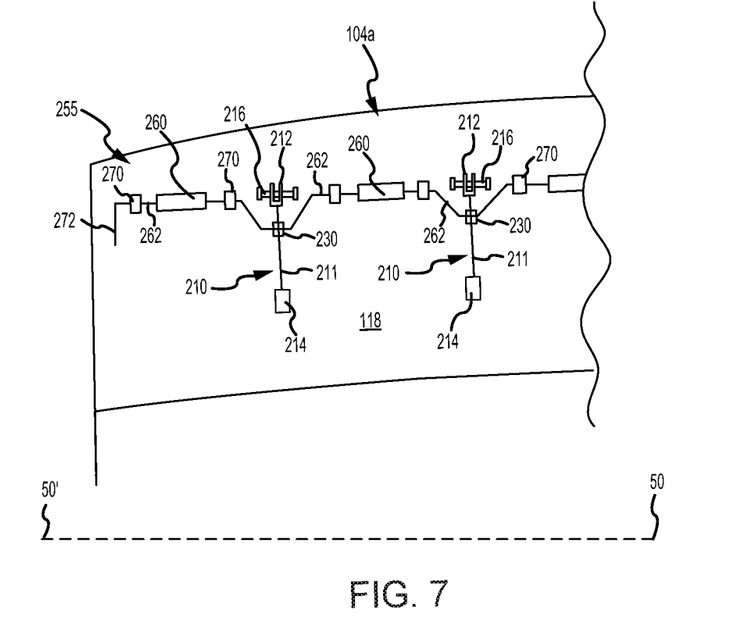
FIG. 7 illustrates a tie rod assembly on an interior surface of a fan cowl, in accordance with various embodiments.

With reference to FIG. 7, a portion of a tie rod assembly 255 coupled to interior surface 118 is illustrated, in accordance with various embodiments. Tie rod assembly 255 includes tie rods 210 and one or more connecting rod(s) 262 extending between, and rotationally coupling, the tie rods 210 of tie rod assembly 255. While two tie rods 210 of tie rod assembly 255 are illustrated in FIG. 7, it is contemplated and understood that tie rod assembly 255 may include any number of tie rods 210.

Tie rods 210 may each include a first end 212, a second end 214, and a shaft 211 extending between first end 212 and second end 214. Tie rods 210 are pivotally coupled to first fan cowl portion 104a via a connector 216 attached to interior surface 118. In various embodiments, first end 212 may include a pair of flanges or a clevis, and connector 216 may include an axle (e.g., a pin, bolt, rod, etc.). Second end 214 of tie rods 210 may be configured to engage second fan cowl portion 104b (FIG. 1B) and maintain first and second fan cowl portions 104a, 104b in the closed position (i.e., prevent first and second fan cowl portions 104a, 104b from pivoting to the open position).

One or more connecting rod(s) 262 may extend between tie rods 210. Connecting rod(s) 262 are rotationally coupled to tie rods 210 such that rotary movement of a tie rod 210 (i.e., translation of tie rod 210 about connector 216) may be transferred to the other tie rods 210 of tie rod assembly 255. Connecting rods 262 may be coupled to shafts 211 of tie rods 210 at a joint 230. Joints 230 are configured to rotationally couple connecting rods 262 to shafts 211 such that rotary motion is transferred between tie rod 210 and connecting rod 262. In various embodiments, joint 230 may comprise a universal joint. In various embodiment, joint 230 may have a rotational tolerance configured to allow a tie rod 210 and/or connecting rod 262 to rotate a predetermined number of degrees without the rotation being transferred to the other tie rods 210 of tie rod assembly 255. Joint 230 may also be configured to reduce or prevent translation of radial movement and/or axial movement between tie rods 210.

In various embodiments, tie rod assembly 255 may include multiple connecting rods 262 coupled to one another via flex joints 260, similar to flex joints 160, 165, 167 in FIG. 5. In various embodiments, flex joints 260 may each comprise a universal joint, a sleeve joint, or other joint configured to translate radial motion between adjacent connecting rods 262. In various embodiment, flex joints 260 may be configured to have a rotational tolerance that allows connecting rods 262 to rotate a predetermined number of degrees without the rotation being transferred to the adjacent connecting rod 262. In various embodiments, flex joints 260 may be configured to reduce or prevent translation of radial movement and/or axial movement between connecting rods 262 (and thus between tie rods 210). In various embodiments, connecting rod(s) 262 may be supported by one or more connectors 270 (for example, clevises) coupled to interior surface 118 of first fan cowl portion 104a.

A crank shaft 272 may be located at an end (e.g., a forward end or an aft end) of connecting rods 262. Crank shaft 272 may rotationally drive connecting rods 262, such that rotation of crank shaft 272 rotates connecting rods 262 and tie rods 210. In various embodiments, tie rods 210 may be retained proximate interior surface 118 by a retention structure, similar to retention structure 126 in FIG. 5.

With combined reference to FIG. 7 and FIG. 1B, during flight, tie rods 210 may latch to second fan cowl portion 104b to hold first and second fan cowl portions 104a, 104b in the closed position. Tie rod assembly 255 may be designed to tolerate some movement of tie rods 210 independent of one another to minimize in-flight loading. For example, tie rod assembly 255 may be designed to tolerate radial, axial, and/or rotary movement of tie rods 210 within a predetermined tolerance to minimize in-flight loading. In this regard, tie rods 210 may be coupled to one another such that tie rods 210 can load independently of the one another. The amount tolerance built into tie rod assembly 255 may vary based on the particular nacelle configuration. Tie rods 210 may be structurally connected (e.g., by connecting rods 262) such that they can be manipulated as a group, thereby allowing tie rods 210 to be stowed as a group, when the fan cowl 104 is in an opened position, and/or aligned with apertures 130 (FIG. 3) as a group, when translating fan cowl 104 to the closed position.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure.

The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. All ranges and ratio limits disclosed herein may be combined.

Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

The steps recited in any of the method or process descriptions may be executed in any order and are not necessarily limited to the order presented. Furthermore, any reference to singular includes plural embodiments, and any reference to more than one component or step may include a singular embodiment or step. Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

Any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts or areas but not necessarily to denote the same or different materials. In some cases, reference coordinates may be specific to each figure.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A tie rod assembly for a fan cowl of a nacelle, comprising:
    a first tie rod pivotally coupled to an interior surface of the fan cowl;
    a first connecting rod coupled to the first tie rod, wherein rotational motion is transferred between the first tie rod and the first connecting rod; and
    a second tie rod pivotally coupled to the interior surface of the fan cowl and in operable communication with the first connecting rod, wherein rotational motion of greater than a predetermined tolerance by at least one of the first tie rod or the second tie rod is transferred to the other of the first tie rod or the second tie rod, and wherein rotational motion of less than the predetermined tolerance by at least one of the first tie rod or the second tie rod is not transferred to the other of the first tie rod or the second tie rod.

2. The tie rod assembly of claim 1, further comprising:
    a second connecting rod coupled to the second tie rod, wherein rotational motion is transferred between the second tie rod and the second connecting rod; and
    a flex joint coupling the first connecting rod and the second connecting rod.

3. The tie rod assembly of claim 2, wherein the flex joint comprises at least one of a flexible sleeve joint or a universal joint.

4. The tie rod assembly of claim 1, wherein the first connecting rod comprises a material that can deformably twist to the predetermined tolerance before transferring rotational motion.

5. The tie rod assembly of claim 1, wherein the first tie rod is coupled to the first connecting rod by at least one of a coupling configured to deformably twist to the predetermined tolerance before transferring rotational motion or a coupling comprising a locking feature configured to allow the first tie rod and the first connecting rod to rotate to the predetermined tolerance before the locking feature is engaged and rotational motion is transferred.

6. The tie rod assembly of claim 1, wherein the first connecting rod comprises a cable configured to transfer a rotational load and absorb a non-rotational load, and wherein the cable comprises a fiber reinforced polymer composite material.

7. A nacelle, comprising:
    a fan cowl; and
    a tie rod assembly coupled to the fan cowl, wherein the tie rod assembly comprises:
        a first tie rod pivotally coupled to an interior surface of the fan cowl,
        a first connecting rod coupled to the first tie rod;
        a second tie rod coupled to the first tie rod and the interior surface of the fan cowl,
        a second connecting rod coupled to the second tie rod; and
        a flex joint coupling the first connecting rod to the second connecting rod, wherein the flex joint is configured to transfer rotational motion between the first connecting rod and the second connecting rod.

8. The nacelle of claim 7, wherein the flex joint comprises at least one of a flexible sleeve joint or a universal joint.

9. The nacelle of claim 7, wherein the fan cowl comprises:
    a first portion hingedly coupled to an outboard side of the nacelle; and
    a second portion hingedly coupled to the outboard side of the nacelle.

10. The nacelle of claim 9, wherein:
    a first end of the first tie rod is coupled to the first portion of the fan cowl;
    a second end of the first tie rod opposite the first end of the first tie rod is configured to couple to the second portion of the fan cowl;
    a first end of the second tie rod is coupled to the first portion of the fan cowl; and
    a second end of the second tie rod opposite the first end of the second tie rod is configured to couple to the second portion of the fan cowl.

11. The nacelle of claim 10, further comprising a pylon located on an inboard side of the nacelle, wherein the pylon defines an aperture configured to receive at least one of the first tie rod or the second tie rod.

12. The nacelle of claim 9, further comprising a retention structure mounted to the interior surface of the fan cowl, wherein the retention structure is configured to engage the first tie rod and retain the first tie rod and the second tie rod proximate the interior surface of the fan cowl.

13. The nacelle of claim 7, wherein the flex joint comprises a universal joint.

14. The nacelle of claim 7, wherein the tie rod assembly is configured such that rotational motion of greater than a predetermined tolerance by at least one of the first tie rod or the second tie rod is transferred to the other of the first tie rod or the second tie rod.

15. A nacelle, comprising:
    a fan cowl;
    a first tie rod coupled to the fan cowl;
    a second tie rod coupled to the fan cowl and the first tie rod;
    a connecting rod coupled to the first tie rod and the second tie rod, the connecting rod being configured to transfer rotational motion between the first tie rod and the second tie rod; and
    a retention structure coupled to an interior surface of the fan cowl and configured to engage the first tie rod.

16. The nacelle of claim 15, wherein the retention structure comprises at least one of a hook, a broom clip, or a snap fastener.

17. The nacelle of claim 15, wherein the connecting rod comprises:
    a first rod coupled to the first tie rod;
    a second rod coupled to the second tie rod; and
    a flex joint coupled to the first rod and the second rod, wherein the flex joint is configured to transfer rotational motion between the first rod and the second rod.

18. The nacelle of claim 17, wherein the flex joint comprises a universal joint.

\* \* \* \* \*